US009940269B2

United States Patent
Menendez et al.

(10) Patent No.: US 9,940,269 B2
(45) Date of Patent: Apr. 10, 2018

(54) CONDITIONALLY RELEASING LOCKS IN RESPONSE TO REQUESTS

(71) Applicant: International Business Machines Corporation, Armonk, NY (US)

(72) Inventors: Terri A. Menendez, Richmond, MA (US); Roity Prieto Perez, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 134 days.

(21) Appl. No.: 15/004,787

(22) Filed: Jan. 22, 2016

(65) Prior Publication Data
US 2017/0212846 A1    Jul. 27, 2017

(51) Int. Cl.
G06F 9/46    (2006.01)
G06F 9/52    (2006.01)
G06F 12/14   (2006.01)

(52) U.S. Cl.
CPC .......... G06F 12/1466 (2013.01); G06F 9/466 (2013.01); G06F 9/52 (2013.01); *G06F 2212/1052* (2013.01)

(58) Field of Classification Search
CPC ........ G06F 12/1466; G06F 9/46; G06F 9/466; G06F 9/52; G06F 9/524
See application file for complete search history.

(56) References Cited

U.S. PATENT DOCUMENTS

| | | | |
|---|---|---|---|
| 6,430,622 B1 * | 8/2002 | Aiken, Jr. ......... | H04L 29/12009 709/230 |
| 6,624,827 B1 * | 9/2003 | Hwang ............... | H04L 12/1822 348/E7.081 |
| 6,965,961 B1 | 11/2005 | Scott | |
| 7,707,194 B2 | 4/2010 | Bresch et al. | |
| 7,882,062 B2 | 2/2011 | Holenstein et al. | |
| 7,962,615 B1 | 6/2011 | Lehr et al. | |
| 7,992,148 B2 | 8/2011 | Collins et al. | |
| 2004/0093469 A1 * | 5/2004 | Glasco ................ | G06F 12/0815 711/145 |
| 2004/0210899 A1 * | 10/2004 | Somogyi ................ | G06F 9/526 718/100 |
| 2006/0253856 A1 * | 11/2006 | Hu ......................... | G06F 9/526 718/104 |

(Continued)

OTHER PUBLICATIONS

Scott et al., "Scalable Queue-Based Spin Locks with Timeout," Symposium on Principles and Practice of Parallel Programming, Jun. 18-20, 2001, pp. 44-52.

*Primary Examiner* — Hal Schnee
(74) *Attorney, Agent, or Firm* — Zilka-Kotab, P.C.

(57) ABSTRACT

In one general embodiment, a computer-implemented method includes identifying a record having a lock being held being held by a first process, where the process is running within a first system of a plurality of systems, sending an identification of the lock for the record to a second system of the plurality of systems, receiving, at the first system, from the second system, information associated with a first request for the lock of the record, determining at the first system a second request for the lock of the record held by the first process, and conditionally releasing the lock being held by the first process, based on an analysis of the information associated with the first request and information associated with the second request.

18 Claims, 6 Drawing Sheets

(56) References Cited

U.S. PATENT DOCUMENTS

| | | | |
|---|---|---|---|
| 2014/0115215 A1* | 4/2014 | Jacobs | G06F 9/524 |
| | | | 710/200 |
| 2014/0181342 A1* | 6/2014 | Antonopoulos | G06F 9/466 |
| | | | 710/200 |
| 2014/0189693 A1* | 7/2014 | Trumbull | G06F 9/466 |
| | | | 718/101 |
| 2017/0039234 A1* | 2/2017 | Wagle | G06F 17/30353 |

* cited by examiner

CONDITIONALLY RELEASING LOCKS IN RESPONSE TO REQUESTS

BACKGROUND

The present invention relates to record processing, and more specifically, this invention relates to optimizing the accessing of records within a system.

Within a system, record locks may be held until explicitly released. A batch job may hold record locks for an extended period of time, which may cause time outs to other transactions that are waiting for these record lock resources. There is therefore a desire to determine if at any given time there are any transactions or other batch job requests on any other systems in a sysplex that are waiting for a lock resource currently being held.

SUMMARY

A computer-implemented method according to one embodiment includes identifying a record having a lock being held being held by a first process, where the process is running within a first system of a plurality of systems, sending an identification of the lock for the record to a second system of the plurality of systems, receiving, at the first system, from the second system, information associated with a first request for the lock of the record, determining at the first system a second request for the lock of the record held by the first process, and conditionally releasing the lock being held by the first process, based on an analysis of the information associated with the first request and information associated with the second request.

According to another embodiment, a computer program product for analyzing lock contention within a system comprises a computer readable storage medium having program instructions embodied therewith, wherein the computer readable storage medium is not a transitory signal per se, and the program instructions are executable by a computer to cause the computer to perform a method. The method includes identifying, by the computer, a record having a lock being held being held by a first process, where the process is running within a first system of a plurality of systems, sending, by the computer, an identification of the lock for the record to a second system of the plurality of systems, receiving, by the computer, from the second system, information associated with a first request for the lock of the record, determining, by the computer, a second request for the lock of the record held by the first process, and conditionally releasing, by the computer, the lock being held by the first process, based on an analysis of the information associated with the first request and information associated with the second request.

A system according to another embodiment includes a processor and logic integrated with and/or executable by the processor, where the logic is configured to identify a record having a lock being held being held by a first process, where the process is running within a first system of a plurality of systems, send an identification of the lock for the record to a second system of the plurality of systems, receive, at the first system, from the second system, information associated with a first request for the lock of the record, determine at the first system a second request for the lock of the record held by the first process, and conditionally release the lock being held by the first process, based on an analysis of the information associated with the first request and information associated with the second request.

Other aspects and embodiments of the present invention will become apparent from the following detailed description, which, when taken in conjunction with the drawings, illustrate by way of example the principles of the invention.

DETAILED DESCRIPTION

The following description discloses several preferred embodiments of systems, methods and computer program products for analyzing lock contention within a system. Various embodiments provide a method to communicate requests for a currently held record lock among a plurality of systems.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "includes" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several preferred embodiments of systems, methods and computer program products for analyzing lock contention within a system.

In one general embodiment, a computer-implemented method includes identifying a record having a lock being held being held by a first process, where the process is running within a first system of a plurality of systems, sending an identification of the lock for the record to a second system of the plurality of systems, receiving, at the first system, from the second system, information associated with a first request for the lock of the record, determining at the first system a second request for the lock of the record held by the first process, and conditionally releasing the lock being held by the first process, based on an analysis of the information associated with the first request and information associated with the second request.

In another general embodiment, a computer program product for analyzing lock contention within a system comprises a computer readable storage medium having program instructions embodied therewith, wherein the computer readable storage medium is not a transitory signal per se, and the program instructions are executable by a computer to cause the computer to perform a method. The method includes identifying, by the computer, a record having a lock being held being held by a first process, where the process is running within a first system of a plurality of systems, sending, by the computer, an identification of the lock for the record to a second system of the plurality of systems, receiving, by the computer, from the second system, information associated with a first request for the lock of the record, determining, by the computer, a second request for the lock of the record held by the first process, and conditionally releasing, by the computer, the lock being held by the first process, based on an analysis of the information associated with the first request and information associated with the second request.

In another general embodiment, a system includes a processor and logic integrated with and/or executable by the processor, where the logic is configured to identify a record having a lock being held being held by a first process, where the process is running within a first system of a plurality of systems, send an identification of the lock for the record to a second system of the plurality of systems, receive, at the first system, from the second system, information associated with a first request for the lock of the record, determine at the first system a second request for the lock of the record held by the first process, and conditionally release the lock being held by the first process, based on an analysis of the information associated with the first request and information associated with the second request.

Figure 1:
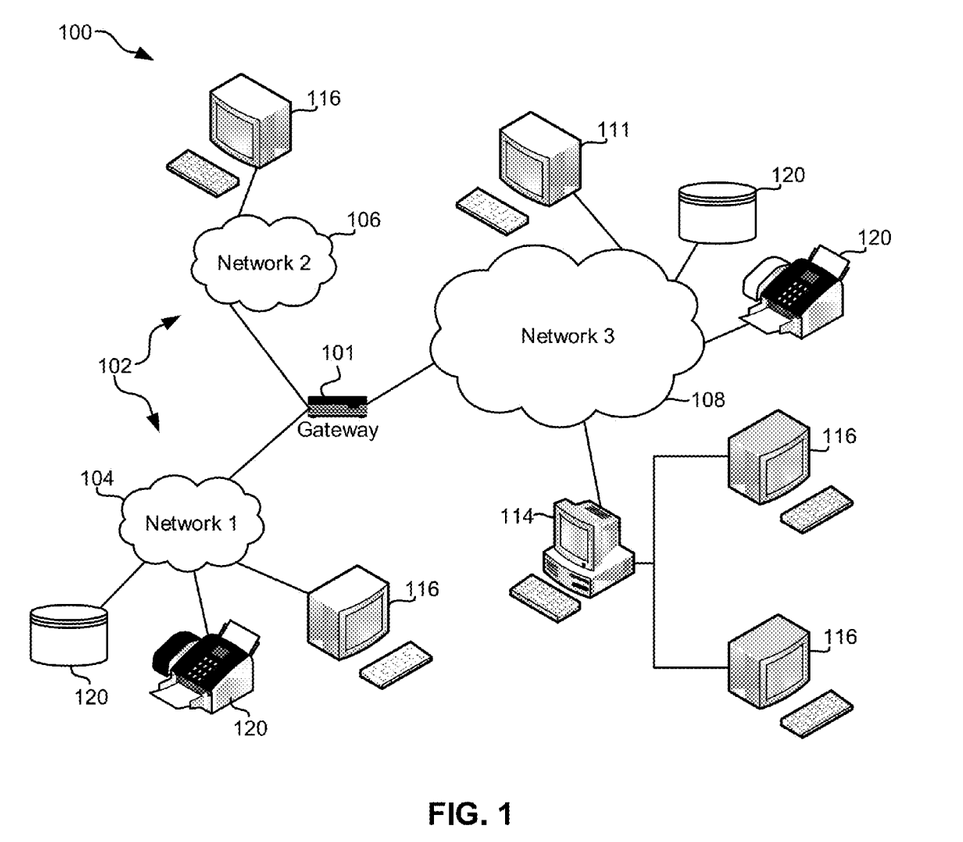
FIG. 1 illustrates a network architecture, in accordance with one embodiment.

FIG. 1 illustrates an architecture 100, in accordance with one embodiment. As shown in FIG. 1, a plurality of remote networks 102 are provided including a first remote network 104 and a second remote network 106. A gateway 101 may be coupled between the remote networks 102 and a proximate network 108. In the context of the present architecture 100, the networks 104, 106 may each take any form including, but not limited to a LAN, a WAN such as the Internet, public switched telephone network (PSTN), internal telephone network, etc.

In use, the gateway 101 serves as an entrance point from the remote networks 102 to the proximate network 108. As such, the gateway 101 may function as a router, which is capable of directing a given packet of data that arrives at the gateway 101, and a switch, which furnishes the actual path in and out of the gateway 101 for a given packet.

Further included is at least one data server 114 coupled to the proximate network 108, and which is accessible from the remote networks 102 via the gateway 101. It should be noted that the data server(s) 114 may include any type of computing device/groupware. Coupled to each data server 114 is a plurality of user devices 116. User devices 116 may also be connected directly through one of the networks 104, 106, 108. Such user devices 116 may include a desktop computer, lap-top computer, hand-held computer, printer or any other type of logic. It should be noted that a user device 111 may also be directly coupled to any of the networks, in one embodiment.

A peripheral 120 or series of peripherals 120, e.g., facsimile machines, printers, networked and/or local storage units or systems, etc., may be coupled to one or more of the networks 104, 106, 108. It should be noted that databases and/or additional components may be utilized with, or integrated into, any type of network element coupled to the networks 104, 106, 108. In the context of the present description, a network element may refer to any component of a network.

According to some approaches, methods and systems described herein may be implemented with and/or on virtual systems and/or systems which emulate one or more other systems, such as a UNIX system which emulates an IBM z/OS environment, a UNIX system which virtually hosts a MICROSOFT WINDOWS environment, a MICROSOFT WINDOWS system which emulates an IBM z/OS environment, etc. This virtualization and/or emulation may be enhanced through the use of VMWARE software, in some embodiments.

In more approaches, one or more networks 104, 106, 108, may represent a cluster of systems commonly referred to as a "cloud." In cloud computing, shared resources, such as processing power, peripherals, software, data, servers, etc., are provided to any system in the cloud in an on-demand relationship, thereby allowing access and distribution of services across many computing systems. Cloud computing typically involves an Internet connection between the systems operating in the cloud, but other techniques of connecting the systems may also be used.

Figure 2:
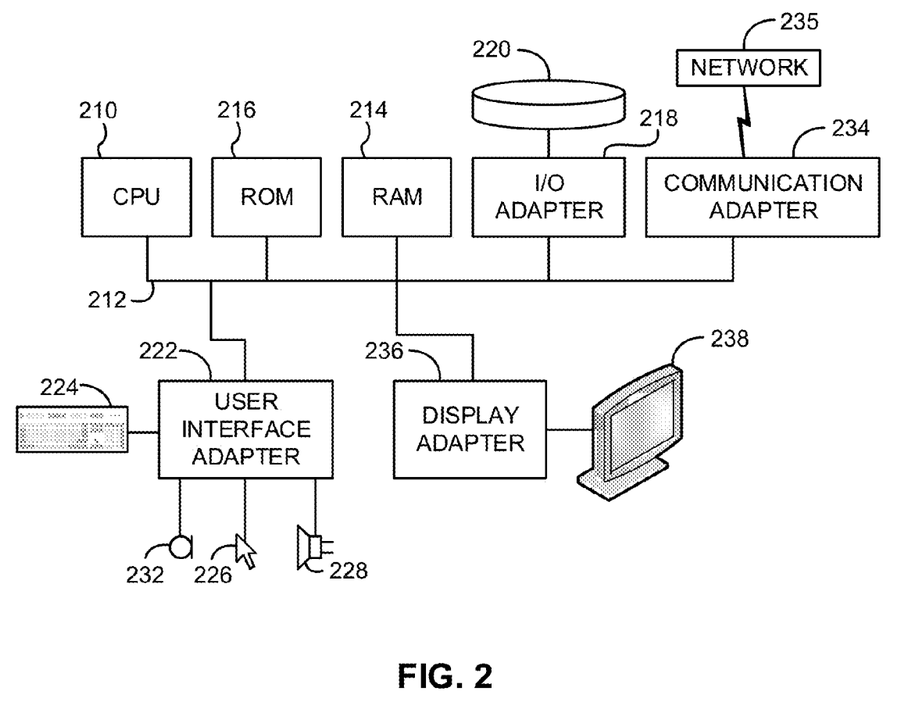
FIG. 2 shows a representative hardware environment that may be associated with the servers and/or clients of FIG. 1, in accordance with one embodiment.

FIG. 2 shows a representative hardware environment associated with a user device 116 and/or server 114 of FIG. 1, in accordance with one embodiment. Such figure illustrates a typical hardware configuration of a workstation having a central processing unit 210, such as a microprocessor, and a number of other units interconnected via a system bus 212.

The workstation shown in FIG. 2 includes a Random Access Memory (RAM) 214, Read Only Memory (ROM) 216, an I/O adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen and a digital camera (not shown) to the bus 212, communication adapter 234 for connecting the workstation to a communication network 235 (e.g., a data processing network) and a display adapter 236 for connecting the bus 212 to a display device 238.

The workstation may have resident thereon an operating system such as the Microsoft Windows® Operating System (OS), a MAC OS, a UNIX OS, etc. It will be appreciated that a preferred embodiment may also be implemented on platforms and operating systems other than those mentioned. A preferred embodiment may be written using XML, C, and/or C++ language, or other programming languages, along with an object oriented programming methodology. Object oriented programming (OOP), which has become increasingly used to develop complex applications, may be used.

Figure 3:
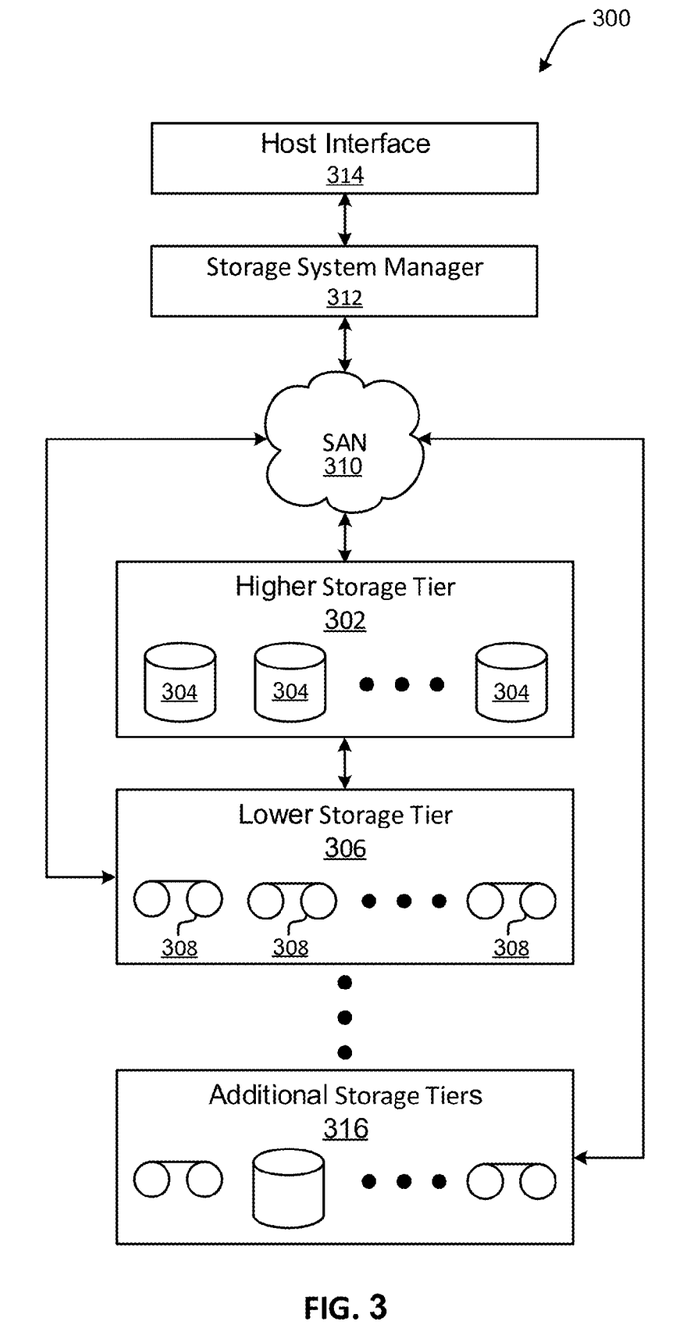
FIG. 3 illustrates a tiered data storage system in accordance with one embodiment.

Now referring to FIG. 3, a storage system 300 is shown according to one embodiment. Note that some of the elements shown in FIG. 3 may be implemented as hardware and/or software, according to various embodiments. The storage system 300 may include a storage system manager 312 for communicating with a plurality of media on at least one higher storage tier 302 and at least one lower storage tier 306. The higher storage tier(s) 302 preferably may include one or more random access and/or direct access media 304, such as hard disks in hard disk drives (HDDs), nonvolatile memory (NVM), solid state memory in solid state drives (SSDs), flash memory, SSD arrays, flash memory arrays, etc., and/or others noted herein or known in the art. The lower storage tier(s) 306 may preferably include one or more lower performing storage media 308, including sequential access media such as magnetic tape in tape drives and/or optical media, slower accessing HDDs, slower accessing SSDs, etc., and/or others noted herein or known in the art. One or more additional storage tiers 316 may include any combination of storage memory media as desired by a designer of the system 300. Also, any of the higher storage tiers 302 and/or the lower storage tiers 306 may include some combination of storage devices and/or storage media.

The storage system manager 312 may communicate with the storage media 304, 308 on the higher storage tier(s) 302 and lower storage tier(s) 306 through a network 310, such as a storage area network (SAN), as shown in FIG. 3, or some other suitable network type. The storage system manager 312 may also communicate with one or more host systems (not shown) through a host interface 314, which may or may not be a part of the storage system manager 312. The storage system manager 312 and/or any other component of the storage system 300 may be implemented in hardware and/or software, and may make use of a processor (not shown) for executing commands of a type known in the art, such as a central processing unit (CPU), a field programmable gate array (FPGA), an application specific integrated circuit (ASIC), etc. Of course, any arrangement of a storage system may be used, as will be apparent to those of skill in the art upon reading the present description.

In more embodiments, the storage system 300 may include any number of data storage tiers, and may include the same or different storage memory media within each storage tier. For example, each data storage tier may include the same type of storage memory media, such as HDDs, SSDs, sequential access media (tape in tape drives, optical disk in optical disk drives, etc.), direct access media (CD-ROM, DVD-ROM, etc.), or any combination of media storage types. In one such configuration, a higher storage tier 302, may include a majority of SSD storage media for storing data in a higher performing storage environment, and remaining storage tiers, including lower storage tier 306 and additional storage tiers 316 may include any combination of SSDs, HDDs, tape drives, etc., for storing data in a lower performing storage environment. In this way, more frequently accessed data, data having a higher priority, data needing to be accessed more quickly, etc., may be stored to the higher storage tier 302, while data not having one of these attributes may be stored to the additional storage tiers 316, including lower storage tier 306. Of course, one of skill in the art, upon reading the present descriptions, may devise many other combinations of storage media types to implement into different storage schemes, according to the embodiments presented herein.

According to some embodiments, the storage system (such as 300) may include logic configured to receive a request to open a data set, logic configured to determine if the requested data set is stored to a lower storage tier 306 of a tiered data storage system 300 in multiple associated portions, logic configured to move each associated portion of the requested data set to a higher storage tier 302 of the tiered data storage system 300, and logic configured to assemble the requested data set on the higher storage tier 302 of the tiered data storage system 300 from the associated portions.

Of course, this logic may be implemented as a method on any device and/or system or as a computer program product, according to various embodiments.

Figure 4:
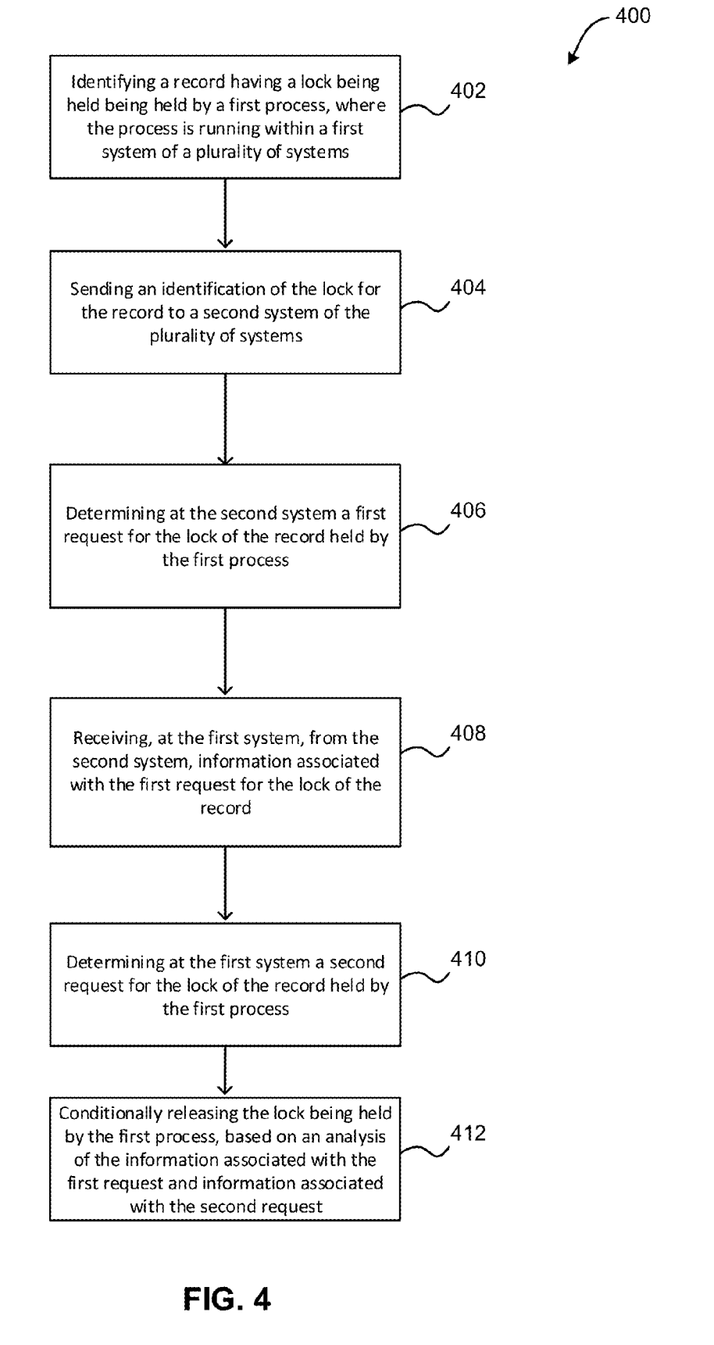
FIG. 4 illustrates a method for analyzing lock contention within a system, in accordance with one embodiment.

Now referring to FIG. 4, a flowchart of a method 400 is shown according to one embodiment. The method 400 may be performed in accordance with the present invention in any of the environments depicted in FIGS. 1-3 and 5-6, among others, in various embodiments. Of course, more or less operations than those specifically described in FIG. 4 may be included in method 400, as would be understood by one of skill in the art upon reading the present descriptions.

Each of the steps of the method 400 may be performed by any suitable component of the operating environment. For example, in various embodiments, the method 400 may be partially or entirely performed by one or more servers, computers, or some other device having one or more processors therein. The processor, e.g., processing circuit(s), chip(s), and/or module(s) implemented in hardware and/or software, and preferably having at least one hardware component may be utilized in any device to perform one or more steps of the method 400. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 4, method 400 may initiate with operation 402, where a record having a lock being held being held by a first process is identified, the process running within a first system of a plurality of systems. In one embodiment, the system may be one of a cluster of additional systems within a predetermined environment (e.g., a sysplex, etc.). In another embodiment, the system may include a server, a personal computer, a mobile device, or any device capable of running the first process. In yet another embodiment, the system may be included within a virtual storage environment. For example, the system may be part of a virtual storage access method (VSAM) environment.

Additionally, in one embodiment, the first process may be associated with one or more applications within the first system. For example, an application of the first system may perform the first process on the record within the first system. In another embodiment, the first process may include one or more actions that are performed with respect to the record. For example, the first process may edit the record, remove the record, create the record, access the record, etc. In yet another embodiment, the first process may be part of a larger group of processes. For example, the first process may be part of a batch of processes to be performed within the first system by the one or more applications. Also, in one embodiment, the first process may include a transactional process (e.g., a customer information control system (CICS) transaction, etc.), a subsystem process, a batch process, etc.

Further, in one embodiment, the record may include any data able to be accessed by the system. In another embodiment, the record may be accessible by all systems within the plurality of systems. For example, the records may include shared data within the sysplex. In yet another embodiment, the record may include storage data (e.g., virtual storage data within a VSAM, etc.). In still another embodiment, the record may be stored within one or more of the plurality of systems, within a storage area separate from the plurality of systems within the predetermined environment.

Further still, in one embodiment, the lock for the record being held by the first process may include an access lock. For example, the lock for the record may provide the first process with exclusive access to the record within the plurality of systems. In another example, the lock for the record may prevent any process other than the first process from accessing the record. In another embodiment, the lock for the record may be held by the first process for a predetermined time. In still another embodiment, the lock for the record may be held by the first process until one or more predetermined criteria are met. For example, the lock for the record may be held by the first process until a command is issued by an application performing the first process.

Also, as shown in FIG. 4, method 400 may proceed with operation 404, where an identification of the lock for the record is sent to a second system of the plurality of systems. In one embodiment, the identification of the lock for the record may include an indication that the first process holds the lock for the record within the first system. In another embodiment, the identification of the lock for the record may be sent to one or more of the plurality of systems. For example, the identification of the lock may be broadcast to all of the plurality of systems.

In addition, in one embodiment, the identification of the lock for the record may be sent to a second system by an entity other than the first system. For example, the identification of the lock for the record may be sent from the first system to a cross-coupling facility (XCF) within a sysplex, where the XCF may then may send the identification of the lock to each of the plurality of systems within the sysplex.

In another embodiment, information associated with the first system may be sent to the second system in conjunction with the identification of the lock for the record. For example, information identifying the first system may be sent to each of the plurality of systems along with the identification of the lock for the record.

Furthermore, as shown in FIG. 4, method 400 may proceed with operation 406, where a first request for the lock of the record held by the first process is determined at the second system. In one embodiment, the first request may be made by a second process that is running within the second system and that is waiting for the lock of the record held by the first process. In another embodiment, the second process may include a process that utilizes (e.g., accesses, etc.) the record. In yet another embodiment, the second process may include a process that is to perform one or more actions to the record (e.g., editing the record, removing the record, etc.). In still another embodiment, the second process may be part of a larger group of processes, may include a transactional process, a subsystem process, a batch process, etc.

Further still, in one embodiment, the first request for the lock of the record may be determined by identifying a plurality of record lock requests within a queue. For example, the first request for the lock of the record may be identified within a global wait queue of the second system that contains a plurality of different requests for locks of records that are currently being held by other processes. In another embodiment, the first request for the lock of the record may be one of a plurality of requests for the lock of the record within the queue. For example, the second process may be one of a plurality of processes within the queue that are waiting for the lock of the record held by the first process.

Also, as shown in FIG. 4, method 400 may proceed with operation 408, where information associated with the first request for the lock of the record is received from the second system at the first system. In one embodiment, the information may include an identification of the second process that initiated the first request. For example, the information may include an identifier of the second process, a name of the second process, etc. In another example, the information may include an indication of a type of process that issued the first request (e.g., a name of a CICS subsystem or batch job that issued the first request for the lock of the record, etc.).

Additionally, in one embodiment, the information may include a timeout value associated with the first request. For example, the second process may time out after a predetermined time if access to the record is not obtained, and the information may include an associated timeout value (e.g., a time remaining until the second process times out, etc.). In another embodiment, the information may include a time the first request for the lock was initiated. In yet another embodiment, the information associated with a plurality of requests for the lock of the record may be returned to the first system. For example, a plurality of requests for the lock of the record may be identified within the global wait queue of the second system, and information associated with each of the plurality of requests may be returned to the first system.

Further, in one embodiment, only information associated with requests having associated timeout values may be returned to the first system. For example, the information associated with the first request for the lock of the record may be returned to the first system in response to a determination that the information includes an associated timeout value. For example, if another request for the lock of the record within the global queue does not time out after a predetermined amount of time, such request may not be returned to the first system. In another embodiment, the information associated with the first request for the lock of the record may be sent from the second system to the XCF within the sysplex, where the XCF may then send the information to the first system.

Further still, as shown in FIG. 4, method 400 may proceed with operation 410, where a second request for the lock of the record held by the first process is determined at the first system. In one embodiment, the second request may be made by a third process that is running within the first system and that is waiting for the lock of the record held by the first process. In another embodiment, the third process may include a process that utilizes (e.g., accesses, etc.) the record. In yet another embodiment, the third process may include a process that is to perform one or more actions to the record (e.g., editing the record, removing the record, etc.). In still another embodiment, the third process may be part of a larger group of processes, may include a transactional process, a subsystem process, a batch process, etc.

Also, in one embodiment, the second request for the lock of the record may be determined by identifying a plurality of record lock requests within a queue. For example, the second request for the lock of the record may be identified within a global wait queue of the first system that contains a plurality of different requests for locks of records that are currently being held by other processes. In another embodiment, the second request for the lock of the record may be one of a plurality of requests for the lock of the record within the queue. For example, the third process may be one of a plurality of processes within the queue that are waiting for the lock of the record held by the first process.

Further still, as shown in FIG. 4, method 400 may proceed with operation 412, where the lock being held by the first process is conditionally released, based on an analysis of the information associated with the first request and information associated with the second request. In one embodiment, the information associated with the second request may include an identification of the third process that initiated the second request. For example, the information may include an identifier of the third process, a name of the third process, etc. In another example, the information may include an indication of a type of process that issued the second request (e.g., a name of a CICS subsystem or batch job that issued the second request for the lock of the record, etc.).

Further, in one embodiment, the information may include a timeout value associated with the second request. For example, the third process may time out after a predetermined time if access to the record is not obtained, and the information may include an associated timeout value (e.g., a time remaining until the third process times out, etc.). In another embodiment, the information may include a time the second request for the lock was initiated.

Further still, in one embodiment, the analysis of the information associated with the first request and the information associated with the second request may include a determination as to an importance of the first and second request. For example, the information associated with the first and second request may be compared to predetermined criteria to determine an importance of each of the requests, a probability that one or more of the requests will time out, etc. In another embodiment, the lock being held by the first process may be released if it is determined that releasing the lock will prevent the second process or the third process from timing out.

Also, in one embodiment, the analysis of the information associated with the first request and the information associated with the second request may include a comparison of one or more values. For example, a timeout value for the first request may be compared to a timeout value for the second request to determine which request has the earlier timeout value (e.g., which associated process has a smaller time remaining until the process times out, etc.). In another embodiment, the lock may be automatically transferred from the first process to the second process or the third process, based on the analysis. For example, the lock may be automatically transferred from the first process to the process having the earlier timeout value, which may resolve any existing lock contention. In still another embodiment, the lock may be released. For example, an explicit sync point (e.g., a commit, a backout, etc.) may be issued by the process, an implicit sync point may be issued at end of task (EOT), etc.

In addition, in one embodiment, the information associated with the first request and the information associated with the second request may be conditionally displayed. For example, the information associated with the first request and the information associated with the second request may be displayed to one or more users of the system as an alert if it is determined that a probability that one or more of the requests will time out exceeds a predetermined threshold. In another embodiment, the information associated with the first request and the information associated with the second request may be automatically displayed to the user to notify the user of existing lock contention.

In this way, process timeouts may be avoided when utilizing record locks within a plurality of systems.

Figure 5:
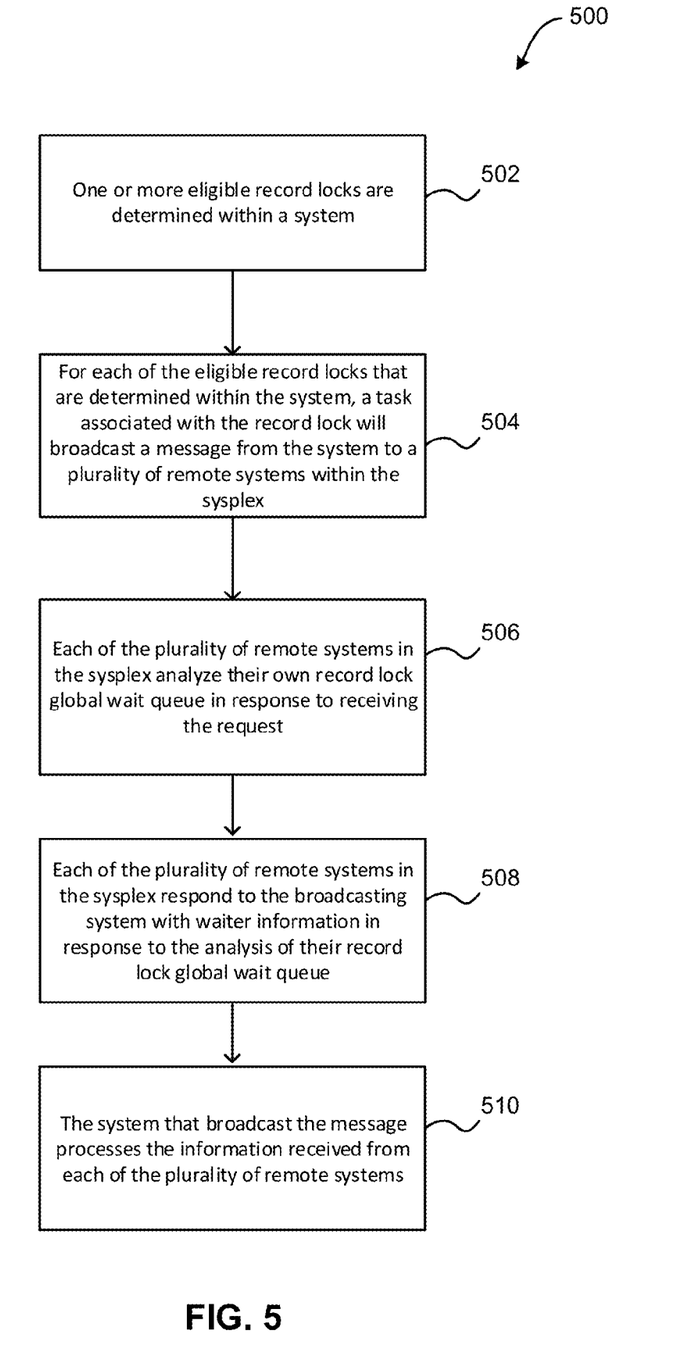
FIG. 5 illustrates a method for detecting record lock contention within a sysplex, in accordance with one embodiment.

Now referring to FIG. 5, a flowchart of a method 500 for detecting record lock contention within a sysplex is shown according to one embodiment. The method 500 may be performed in accordance with the present invention in any of the environments depicted in FIGS. 1-4 and 6, among others, in various embodiments. Of course, more or less operations than those specifically described in FIG. 5 may be included in method 500, as would be understood by one of skill in the art upon reading the present descriptions.

Each of the steps of the method 500 may be performed by any suitable component of the operating environment. For example, in various embodiments, the method 500 may be partially or entirely performed by one or more servers, computers, or some other device having one or more processors therein. The processor, e.g., processing circuit(s), chip(s), and/or module(s) implemented in hardware and/or software, and preferably having at least one hardware component may be utilized in any device to perform one or more steps of the method 500. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 5, method 500 may initiate with operation 502, where one or more eligible record locks are determined within a system. In one embodiment, each of a plurality of systems (e.g., each SMSVSAM address space in a sysplex, etc.) may have a task that wakes up on a timer specified value to analyze sysplex wide record lock contention for each eligible Transactional VSAM batch job. In another embodiment, each of the one or more eligible record locks may be made by a process. For example, an eligible process may include a batch job that performs automatic commits or that reports on sysplex wide record lock waiter information for each record lock that it holds. In yet another embodiment, an application may obtain one or more of the record locks and may specify how often it wants the task to perform sysplex wide record lock analysis or let the system use a default value.

Additionally, method 500 may proceed with operation 504, where for each of the eligible record locks that are determined within the system, a task associated with the record lock will broadcast a message from the system to a plurality of remote systems within the sysplex. In one embodiment, the broadcast may be performed using one or more XCF coupling facility services. In another embodiment, the broadcasted message may contain information about the record lock being analyzed and the system that it is collecting the information.

Further, method 500 may proceed with operation 506, where each of the plurality of remote systems in the sysplex analyze their own record lock global wait queue in response to receiving the request. In one embodiment, the global wait queue may contain a list of all requests that are waiting for any record locks in the sysplex. In another embodiment, each node in the list may contain information about the lock being waited on, a subsystem name or batch job name issuing the request, a time the request started, and a time out value if one was specified.

Further still, method 500 may proceed with operation 508, where each of the plurality of remote systems in the sysplex respond to the broadcasting system with waiter information in response to the analysis of their record lock global wait queue. In one embodiment, waiter information may include information associated with a process that is waiting for one or more of the eligible record locks. In another embodiment, if the remote system recognizes that the lock being processed is being waited on, it may reply with the waiter information and whether the waiters are CICS transactions or batch jobs as well as the specific time the requests will time out.

Also, method 500 may proceed with operation 510, where the system that broadcast the message processes the information received from each of the plurality of remote systems. In one embodiment, the system may process the information in response to a determination that all remote systems have replied. In another embodiment, a server task of the system may analyze its own global wait queue and combine that information with the information received from the rest of the systems in the sysplex. In this way, the system may have a complete list of transactions that are waiting for a specific record lock held within the system.

Additionally, in one embodiment, depending on what parameters were specified by the application, the system may perform one or more actions. For example, the system may display the information that was collected to inform one or more operators about the lock contention. In another embodiment, the system may make a decision on whether to commit a unit of recovery based on an importance of one or more of the waiters and whether they will time out or not. In yet another embodiment, if the transaction is committed by the system, the system may release one or more of the locks and may therefore avoid timing out other CICS transactions, etc.

Figure 6:
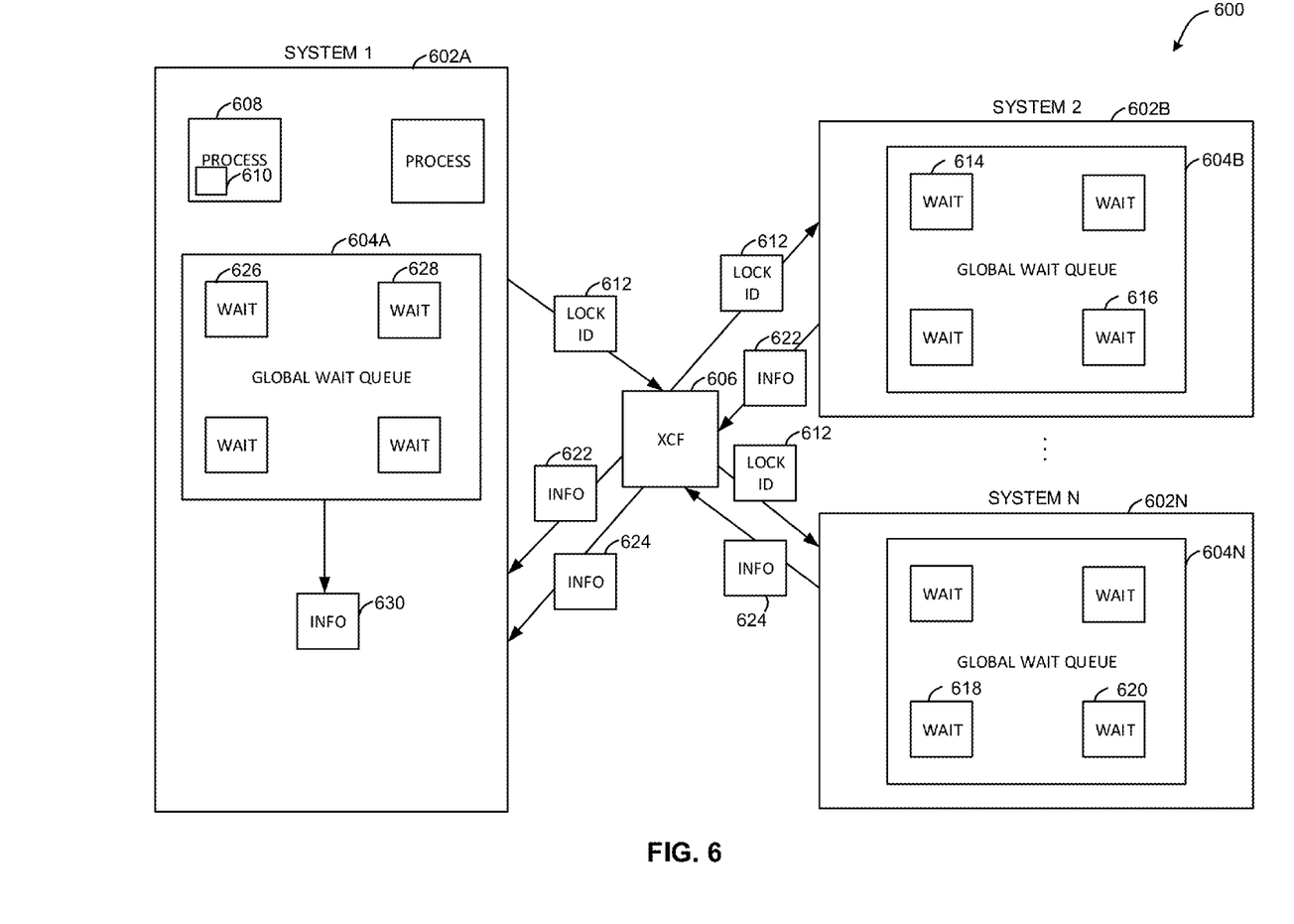
FIG. 6 illustrates an exemplary sysplex record lock contention environment, in accordance with one embodiment.

FIG. 6 illustrates an exemplary sysplex record lock contention environment 600, in accordance with one embodiment. As shown in FIG. 6, the sysplex record lock contention environment 600 includes a plurality of systems 602A-N having respective global wait queues 604A-N. Additionally, the plurality of systems 602A-N within the sysplex record lock contention environment 600 are in communication with each other via a XCF 606.

In one embodiment, the first system 602A may identify a first process 608 that holds a lock 610 to a record. In another embodiment, an identification of the lock 612 may be sent from the first system 602A to the XCF 606, which in turn may broadcast the identification of the lock 612 to the other systems 602B-N.

Additionally, in one embodiment, each of the other systems 602B-N may check their respective global wait queues 604B-N to identify any processes waiting for the lock 610 that have associated timeout values in response to receiving the identification of the lock 612 from the XCF 606. For example, the second system 602B may check its global wait queue 604B and may identify two waiters 614 and 616 that include processes with outstanding wait requests for the lock 610. Likewise, the Nth system 602N may check its global wait queue 604N and may identify two waiters 618 and 620 that include processes with outstanding wait requests for the lock 610.

Further, in one embodiment, in response to the identification of processes 614 and 616 by each of the other systems 602B-N, the second system 602B may send information 622, and the Nth system 602N may send information 624, to the first system 602A via the XCF 606. For example, the information 622 may include a description of the two waiters 614 and 616 waiting for the lock 610, timeout values associated with each of the waiters 614 and 616, a time the request for the lock 610 was initiated by the waiters 614 and 616, an indication as to whether the waiters 614 and 616 originate from a CICS or batch process, etc. In another example, the information 624 may include a description of the two waiters 618 and 620 waiting for the lock 610, timeout values associated with each of the waiters 618 and 620, a time the request for the lock 610 was initiated by the waiters 618 and 620, an indication as to whether the waiters 618 and 620 originate from a CICS or batch process, etc.

Further still, in one embodiment, upon receiving the information 622 from the second system 602B and the information 624 from the Nth system 602N, the first system 602A may check its global wait queue 604A to identify any processes waiting for the lock 610 that have associated timeout values. For example, the first system 602A may check its global wait queue 604A and may identify two waiters 626 and 628 that include processes with outstanding wait requests for the lock 610. In another embodiment, the first system 602A may identify information 630 that may include a description of the two waiters 626 and 628 waiting for the lock 610, timeout values associated with each of the waiters 626 and 628, a time the request for the lock 610 was initiated by the waiters 626 and 628, an indication as to whether the waiters 626 and 628 originate from a CICS or batch process, etc.

Also, in one embodiment, the first system 602A may perform lock waiter analysis with respect to the lock 610, utilizing the information 622, the information 624, and the information 630. For example, the system may commit the lock 610 to the first process 608 if it is determined that none of the waiters 614-620, 626, and 628 would time out during process 608 holding of the lock 610. In another example, the first system 602A may transfer the lock 610 to one of the waiters 614-620, 626, and 628 that has the closest timeout value. In yet another example, the first system 602A may present a report including an identification of the waiters 614-620, 626, and 628 to one or more users.

In this way, record lock contention information may be shared between systems 602A-N utilizing the XCF 606, and may be analyzed by the systems to perform lock waiter analysis.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which includes one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A computer-implemented method, comprising:
   identifying a record having a lock being held being held by a first process, where the first process is running within a first system of a plurality of systems;
   sending an identification of the lock to a second system of the plurality of systems, where the identification of the lock includes an indication that the first process of the first system holds the lock for the record within the first system;
   receiving at the first system, from the second system in response to the identification of the lock, information associated with a first request by the second system for the lock, where the information associated with the first request includes:
     an identification of a second process of the second system that initiated the first request,
     a timeout value associated with the first request, and a time the first request was initiated by the second process;
identifying a plurality of additional requests within a queue of the first system;
determining at the first system a second request for the lock of the record, where the second request is included within the plurality of additional requests within the queue of the first system, and where information associated with the second request includes:
 an identification of a third process of the first system that initiated the second request,
 a timeout value associated with the second request, and
 a time the second request was initiated by the third process; and
conditionally releasing the lock being held by the first process, based on an analysis of the information associated with the first request and the information associated with the second request, where the analysis includes:
 determining whether releasing the lock being held by the first process will prevent the second process or the third process from timing out, and
 releasing the lock being held by the first process in response to determining that releasing the lock being held by the first process will prevent the second process or the third process from timing out.

2. The computer-implemented method of claim 1, wherein the lock for the record provides the first process with exclusive access to the record within the plurality of systems.

3. The computer-implemented method of claim 1, wherein the identification of the lock is broadcast to all of the plurality of systems.

4. The computer-implemented method of claim 1, wherein:
the plurality of systems are included within a sysplex, and
the identification of the lock for the record is sent from the first system to a cross-coupling facility (XCF) within the sysplex.

5. The computer-implemented method of claim 1, wherein the queue of the first system indicates all record locks made by the plurality of systems within a sysplex that are requested by one or more processes of the first system.

6. The computer-implemented method of claim 1, wherein the identification of the lock is sent to each of the plurality of systems, and the analysis of the information associated with the first request and the information associated with the second request is performed in response to determining that all of the plurality of systems have replied in response to the identification of the lock.

7. The computer-implemented method of claim 1, wherein the information associated with the first request further includes an indication as to whether the first request originates from a customer information control system (CICS) transaction or a batch process.

8. The computer-implemented method of claim 1, wherein the record includes virtual storage data within a virtual storage access method (VSAM) environment.

9. The computer-implemented method of claim 1, wherein the analysis of the information associated with the first request and the information associated with the second request includes:
comparing the timeout value associated with the first request to the timeout value associated with the second request to determine a request having an earlier timeout value; and
releasing the lock being held by the first process; and transferring the lock to a process associated with the request having the earlier timeout value.

10. A computer program product for analyzing lock contention within a system, the computer program product comprising a computer readable storage medium having program instructions embodied therewith, wherein the computer readable storage medium is not a transitory signal per se, the program instructions executable by a computer to cause the computer to perform a method comprising:
identifying, by the computer, a record having a lock being held being held by a first process, where the first process is running within a first system of a plurality of systems;
sending, by the computer, an identification of the lock to a second system of the plurality of systems, where the identification of the lock includes an indication that the first process of the computer holds the lock for the record within the first system;
receiving, by the computer, from the second system in response to the identification of the lock, information associated with a first request by the second system for the lock, where the information associated with the first request includes:
 an identification of a second process of the second system that initiated the first request,
 a timeout value associated with the first request, and
 a time the first request was initiated by the second process;
identifying a plurality of additional requests within a queue of the first system;
determining, by the computer, a second request for the lock of the record, where the second request is included within the plurality of additional requests within the queue of the first system, and where information associated with the second request includes:
 an identification of a third process of the first system that initiated the second request,
 a timeout value associated with the second request, and
 a time the second request was initiated by the third process; and
conditionally releasing, by the computer, the lock being held by the first process, based on an analysis of the information associated with the first request and the information associated with the second request where the analysis includes:
 determining, by the computer, whether releasing the lock being held by the first process will prevent the second process or the third process from timing out, and
 releasing, by the computer, the lock being held by the first process in response to determining that releasing the lock being held by the first process will prevent the second process or the third process from timing out.

11. The computer program product of claim 10, wherein the lock for the record provides the first process with exclusive access to the record within the plurality of systems.

12. The computer program product of claim 10, wherein the identification of the lock is broadcast to all of the plurality of systems.

13. The computer program product of claim 10, wherein:
the plurality of systems are included within a sysplex, and
the identification of the lock for the record is sent from the first system to a cross-coupling facility (XCF) within the sysplex.

14. The computer program product of claim 10, wherein the queue of the first system indicates all record locks made by the plurality of systems within a sysplex that are requested by one or more processes of the first system.

15. The computer program product of claim 10, wherein the identification of the lock is sent to each of the plurality of systems, and the analysis of the information associated with the first request and the information associated with the second request is performed in response to determining that all of the plurality of systems have replied in response to the identification of the lock.

16. The computer program product of claim 10, wherein the information associated with the first request further includes an indication as to whether the first request originates from a customer information control system (CICS) transaction or a batch process.

17. The computer program product of claim 10, wherein the record includes virtual storage data within a virtual storage access method (VSAM) environment.

18. A system, comprising:
a processor; and
logic integrated with the processor, executable by the processor, or integrated with and executable by the processor, the logic being configured to:
identify a record having a lock being held being held by a first process, where the first process is running within a first system of a plurality of systems;
send an identification of the lock to a second system of the plurality of systems, where the identification of the lock includes an indication that the first process of the first system holds the lock for the record within the first system;
receive at the first system, from the second system in response to the identification of the lock, information associated with a first request by the second system for the lock, where the information associated with the first request includes:
an identification of a second process of the second system that initiated the first request,
a timeout value associated with the first request, and
a time the first request was initiated by the second process;
identify a plurality of additional requests within a queue of the first system;
determine at the first system a second request for the lock of the record, where the second request is included within the plurality of additional requests within the queue of the first system, and where information associated with the second request includes:
an identification of a third process of the first system that initiated the second request,
a timeout value associated with the second request, and
a time the second request was initiated by the third process; and
conditionally release the lock being held by the first process, based on an analysis of the information associated with the first request and the information associated with the second request, where the analysis includes:
determining whether releasing the lock being held by the first process will prevent the second process or the third process from timing out, and
releasing the lock being held by the first process in response to determining that releasing the lock being held by the first process will prevent the second process or the third process from timing out.

* * * * *